United States Patent [19]
Moor

[11] Patent Number: 5,209,842
[45] Date of Patent: May 11, 1993

[54] OIL ENHANCING MULTIFUNCTION FILTER

[76] Inventor: Stephen E. Moor, 816 Fay Ct., Point Pleasant, N.J. 08742

[21] Appl. No.: 830,386

[22] Filed: Feb. 3, 1992

Related U.S. Application Data

[63] Continuation-in-part of Ser. No. 564,329, Aug. 8, 1990, abandoned.

[51] Int. Cl.⁵ .............................................. B01D 27/00
[52] U.S. Cl. ..................................... 210/168; 210/232; 210/209; 210/DIG. 17; 123/1 A; 123/196 A; 252/10; 252/58
[58] Field of Search ................ 210/168, 248, 206, 209, 210/DIG. 17, 232; 252/10, 58; 184/6.21, 6.24; 123/196 A, 196 R, 1 A

[56] References Cited

U.S. PATENT DOCUMENTS

| | | | |
|---|---|---|---|
| 3,933,656 | 1/1976 | Reick | 252/58 |
| 4,151,823 | 5/1979 | Grosse et al. | 210/168 |
| 4,507,199 | 3/1985 | Carlisle | 210/248 |

*Primary Examiner*—Matthew O. Savage
*Attorney, Agent, or Firm*—Louis S. Gillow

[57] ABSTRACT

An oil filter cartridge for internal combustion engines that employ oil filters in their operation. The input side of the cartridge is filled with microscopic solid lubricating particles of polytetrafluoroethyline (PTFE) dispersed in an oil carrier base. The microscopic particles of PTFE are of varying sizes, with the finest below the minimum given size of the filter and pass immediately into the oil circulating system. The larger sizes are gradually broken down by the high temperature, pressure and swirling flow within the filter cartridge so as to gradually pass through the filter to provide enhanced lubrication by the circulating oil during the operating life of the oil filter cartridge.

4 Claims, 2 Drawing Sheets

OIL ENHANCING MULTIFUNCTION FILTER

This is a continuation-in-part patent application of U.S. patent application Ser. No. 564,329 filed Aug. 08, 1990, now abandoned.

BACKGROUND OF THE INVENTION

The United States Bureau of Standards states that oil does not wear out mechanically. However, oil does get contaminated by exposure to an engine's environment. These contaminants are primarily soot, dirt, sludge, water, fuel metals, acids and oxidation products which gradually degrade the oil and are factors that ultimately break down the oil to reduce its effectiveness and contribute to engine wear.

There are two main contributing factors that are responsible for the breakdown of the integrity of the lubricating oil and the subsequent engine wear and ultimate damage: The first is particulate or mechanical, consisting of dust or grit from the air intake, carbon from combustion and wear metals from the metal to metal contact in the engine. The second factor is chemical in origin. Exposure to the high temperature of engine operation along with the combustion gases, such as $CO$, $CO_2$, and $SO_2$, combine with the moisture present in the lubricating system to form various acid based compounds harmful to both the oil and the engine.

DESCRIPTION OF THE PRIOR ART

In my earlier U.S. Pat. No. 4,751,901, most of the mechanical contaminants, which are mainly particulates, are removed by a mechanical contaminant filter that has the highest possible degree of filtration of the most minute elements of the particulates that might cause damage to the engine. However, the finer the filter the more impedance to the flow and circulation of the oil. Filters that are capable of removing particulates in the 10 micron range and below are typically used in secondary by-pass filtration and are not practical for primary full flow applications. In this earlier patent, the chemical contaminants, which are invisible but also harmful, are overcome by introducing a series of compensating chemicals into the body of the filter material or media and are released through the life of the oil filter cartridge, to maintain the chemical balance of the lubricating oil, and to minimize the corrosive damage to the engine. The use of my earlier patent adds considerably to the life of the engine.

Also found in the prior art, a container of polytetrafluoroethyline (PTFE) additives are poured directly into the crankcase. This has the effect of initially reducing friction, but it is an abrupt manner in which to introduce this material into a balanced lubricating system. Also, the prior art incorporates outside agents and compounds into their respective PTFE mixtures to make their respective formulations perform the task intended. (See U.S. Pat. nos. 3,933,656; 4,127,491; 4,284,518 and 4,888,122)

OBJECTS OF THE INVENTION

It is an object of this invention to provide an enhanced lubricant that includes particles of solid lubricating materials of the same size ranges as that of the contaminant abrasives. This will counteract the abrasive particles and improve the overall lubrication of the engine. This will also reduce the generation of certain of the mechanical contaminants, such as metallic engine wear particles. The oil filter will perform its primary function of removing the larger mechanical abrasive particles (on average 20 microns or more), and in due course permit the circulation of mechanical particulates along with enhancing lubricating particles and masses generally in the 20 micron range and below. The enhanced lubricant is in the form of a solid, rather than a liquid, consisting of various particle sizes of the solid lubricating PTFE material.

It is another object of the invention to add the solid lubricant to the engine oil supply in gradual increments that maintain a sustained release of additional solid lubricant for as long as is practical.

It is an additional object of the invention to provide the PTFE solid lubricant in microscopic units of varying sizes so that, as the finer units are liberated (at first to become an integral part of the oil composition and later burnished onto the engine metal surface), the larger units of the PTFE that are held back initially by the filter media, will be gradually reduced in size by by the high temperature, pressure and swirling flow in the cartridge so as to gradually break apart the bi-polar attracted PTFE particles so they will leach into the circulating oil system and enhance the lubricating process.

SUMMARY OF THE INVENTION

An oil filter for internal combustion engines that employ oil filters in their operation may be of any conventional type, but it is initially filled or treated at the point of manufacture with a liquid vehicle containing a dispersion of various sizes of PTFE solid lubricant. The liquid vehicle is an American Petroleum Institute (API) approved oil base, with or without a chemical supplement, such as disclosed in my U.S. Pat. No. 4,751,901 for maintaining ideal conditions of the lubricating oil. The PTFE particles are of various sizes dispersed in the liquid vehicle. The finest particles are able to pass through the filter media immediately. The larger particles of agglomerated masses gradually break apart and liberate smaller particles which then pass through the filter media so as to continually enhance the lubricating properties of the circulating oil.

The solid lubricating PTFE particles in the dispersion not only cushion the metal to metal contact between the engine surfaces, but also adhere to and become burnished onto the metal surfaces where heavy contact is made. The addition of PTFE is in sufficient quantities to provide additional lubricity to the circulating oil and, at the same time, not overburden the filter media so as to restrict its primary function of filtering out the mechanical abrasives. In this way the invention assures superior enhanced performance during the operation of the filter cartridge.

In the invention, the larger agglomerated masses of PTFE particles are held back by the filter media until they are gradually reduced in size by the high temperature, pressure and swirling flow in the filter cartridge. Then, gradually the particles and agglomerated masses below 20 microns will pass through the filter media in a time release manner to continually enhance the circulating oil during the usable life of the oil filter cartridge.

DETAILED DESCRIPTION

An oil filter cartridge for internal combustion engines that employ full flow filters. The cartridge is pre-charged at the point of manufacture with a liquid vehicle containing a dispersion of PTFE solid lubricant. After installation on the engine the oil filter performs its standard function of filtering abrasive contaminants, and it performs the additional function of systematically and gradually adding PTFE solid lubricant to enhance the lubricity of the circulating oil during the operating life of the oil filter cartridge.

Figure 1:
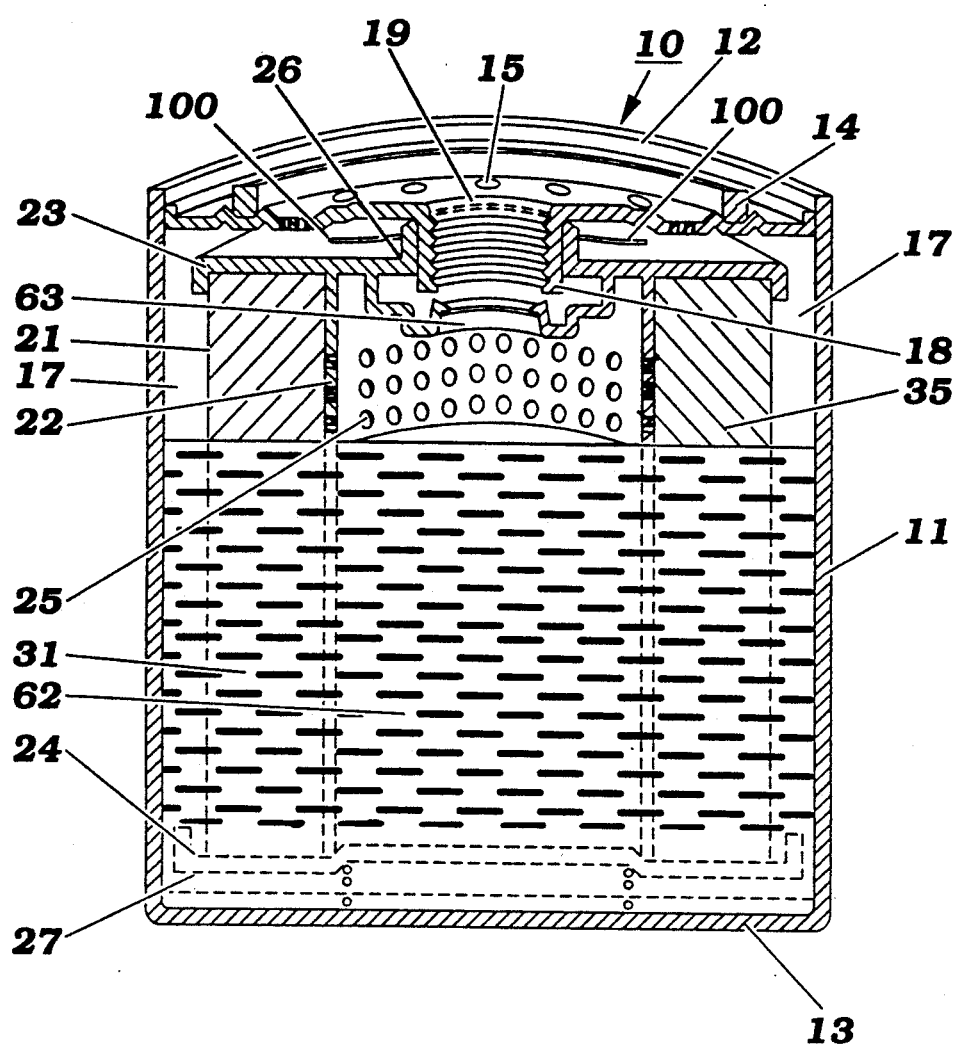
FIG. 1 shows a cross section of a typical oil filter cartridge with the addition of an impregnated liquid vehicle therein.
Figure 4:
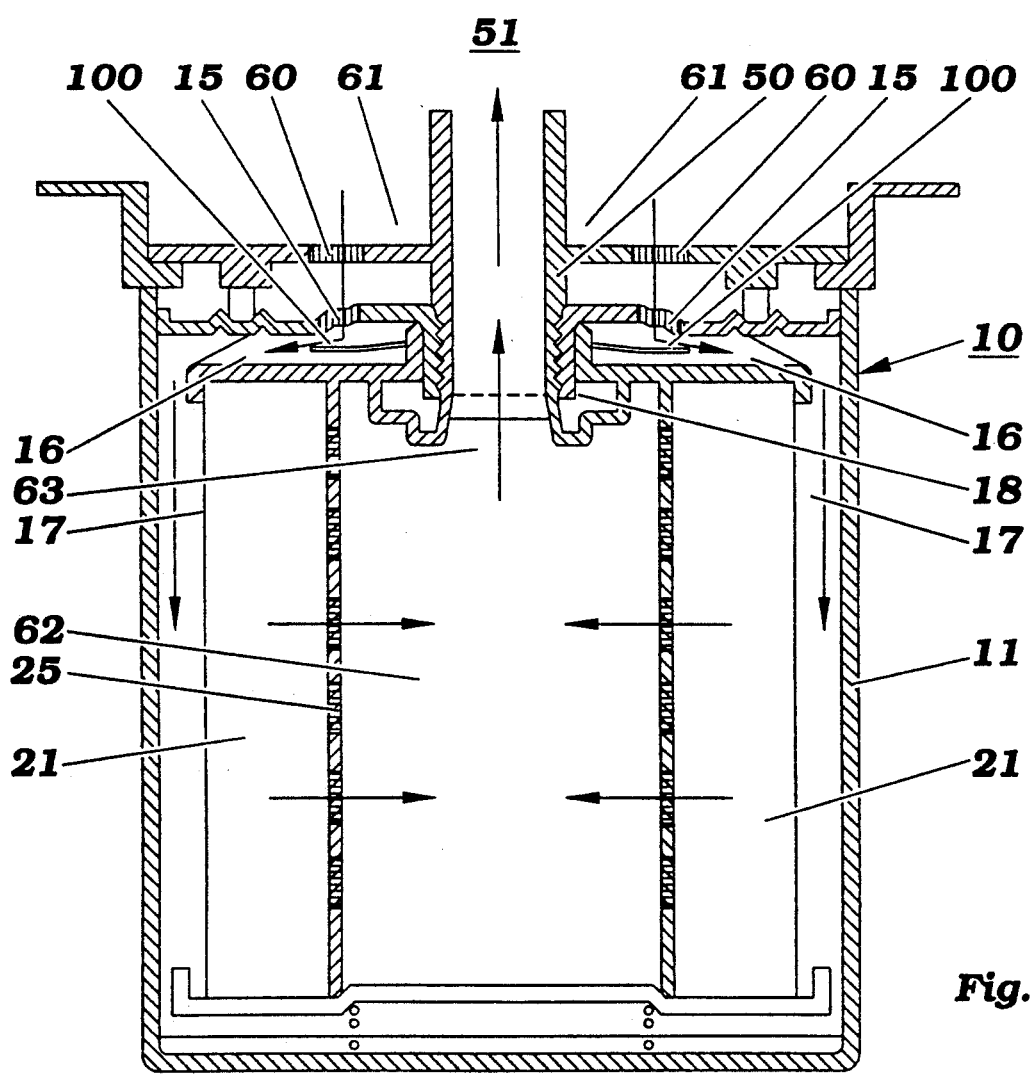
FIG. 4 shows a cross section of the oil filter cartridge installed on the engine with a schematic flow of the liquid vehicle and circulating oil.

Referring now to FIGS. 1 and 4, the oil filter cartridge 10 is a sealable container with an outer casing 11, a top section 12 and a bottom section 13. The top section 12 joins with a standard coupling unit 50 the engine 51 to seal and isolate the input side 16 and the output side 62 of an oil circulating loop within the cartridge 10 so as to lubricate the engine 51 with circulating oil and an enhanced lubricant.

A gasket 14 seals the filter 10 to the engine 51. Multiple holes or perforations 15 in the top section 12 direct the circulating oil into the upper plenum input side 16 of the cartridge 10 to flow down the side spaces 17 to be drawn through the filtering element or media 21 that removes the larger mechanical particulates that might abrade the moving parts of the engine 51.

The filter media 21 is effectively mounted in a cartridge within the cartridge 10. The filter element 21 is of a porous material (typically one layer of resin impregnated pleated paper rated at aproximately 20 micron filtration for the standard full flow spin-on oil filter), that is wrapped or positioned around the tubular core output side 22, which is tightly secured to the top end cap 23 and the bottom end cap 24. The output side 22 has a multiplicity of holes 25 for the flow of oil and liquid vehicle from the input side 16 and through the filter media 21. The top end cap 23 has an annular top portion 26 that fits tightly around a tubular projection 18 from the top section 12 of the outer casing 11. The projection 18 has inner threads 19 in its output opening 63 that can draw the cartridge 10 against the coupling unit 50 on the engine 51.

The outer rim of the top section 23 folds over the filtering element 21 to hold it in place, and to allow the flow of circulating oil down the input side 16 to the side spaces 17 and then through the whole of the filtering element 21. The outer edge of the bottom section forms a junction 27 that fits snugly against the outer casing 11 of the cartridge 10.

The circulating oil, or the liquid vehicle 31, flows down through the slots 60 in the crankcase 61, passes through the holes 15, is drawn into the input side upper plenum 16 and side spaces 17, through the filtering element or media 21, and through the holes or perforations 25 in the output side tubular core 22, to the central output opening 63 to reenter the engine 51 through the tubular projection 18 and the coupling unit 50. A rubber gasket 100 acts as a one way valve which allows the unfiltered circulating oil to enter through the input ports 15 while not allowing the oil to flow back out, once in.

Figure 3:
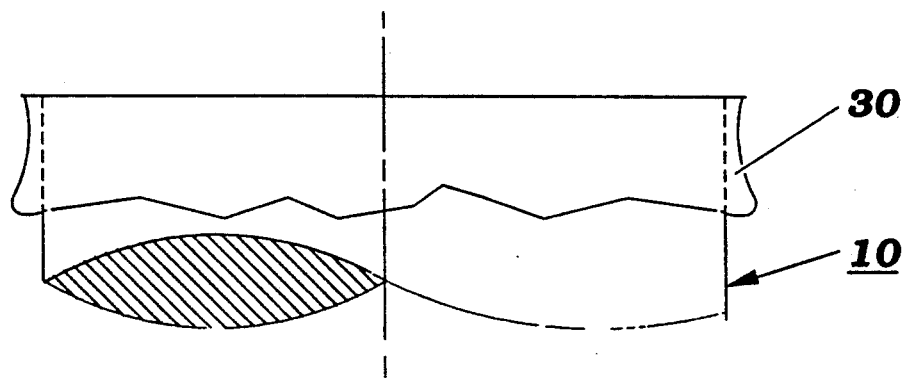
FIG. 3 shows a side view of the top portion of the oil filter cartridge after sealing for shipment.

An aluminum foil, laminated paper, or shrink wrapped material 30 is adhered to the top section 12, the gasket 14 and the top rim 12 after filling the cartridge 10 to prevent leakage during shipping and handling, as shown in FIG. 3. The adhered material is removed by the installer prior to placement of the cartridge on the engine 51.

Figure 2:
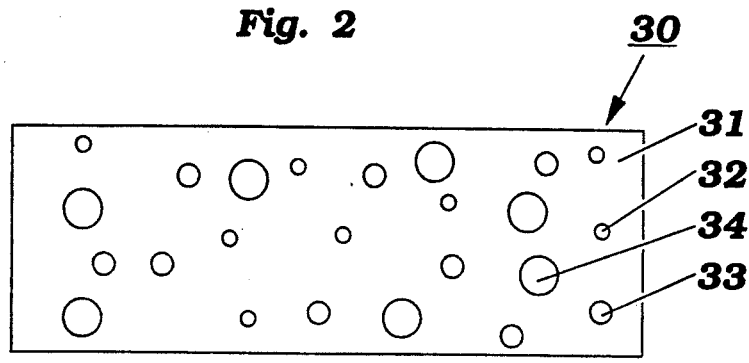
FIG. 2 shows an enlarged cross section of a minute portion of the impregnated liquid vehicle with varying sizes of microscopic particulates and agglomerated masses of PTFE solid lubricant.

FIG. 2 shows a cross section of a very minute portion of the liquid vehicle 31 containing the dispersed PTFE. FIG. 2 is very greatly enlarged to show the variations in sizes of particles and agglomerated masses of PTFE. In this case the finest microscopic particles and masses under 20 microns in size 32 will pass through the filtering element 21 to immediately enhance the lubrication of the engine 51. The slightly larger agglomerated masses 33 will be held within the input side 16 and side spaces 17 until the high temperature, pressure and swirling flow of the circulating oil and liquid vehicle 31 reduce the agglomerated masses 33,34 to particles below 20 microns in size to enable them to pass through the filtering element 21 and add to those particles 32 that have been burnished onto the wear surfaces of the engine 51. When all of the original PTFE particles 32 and the larger agglomerated masses 33,34 have been physically separated and are able to pass through the filtering element 21, approximately 3000-4000 miles of engine use will have elapsed and it would be time to re-the oil filter cartridge 10 and the circulating oil.

The oil filtering element 21 of the cartridge 10 is pre-charged or treated at the point of manufacture with a controlled amount of the dry lubricant. The preferred dry lubricant is PTFE supplied under the tradename TEFLON ® MP 1100 by the E. I. DuPont de Nemours, Inc., Wilmington, Del. The PTFE is dispersed within a liquid vehicle 31 of 30 weight API approved carrier oil in aproximately: 1 ounce of carrier oil with $\frac{1}{2}$ ounce of PTFE per 4 cylinder engine 1$\frac{1}{2}$ ounce of carrier oil with $\frac{3}{4}$ ounce of PTFE for a 6 cylinder engine; and 1$\frac{3}{4}$ ounce of carrier with 1 ounce of PTFE for a 8 cylinder engine; etc.

PTFE has one of the lowest friction coefficients along with being rather chemically inert. TEFLON ® MP 1100 has a high melting point of 608° F. and it has an average particle size of 3 microns, with 90% smaller than 8 microns and 10% smaller than 2 microns. PTFE particles tend to stick to one another and further tend to draw moisture out of the atmosphere, like a desiccant. When PTFE and oil are mixed, the mixture must be agitated vigorously for a long period in order to become homogeneous. Even if a homogeneous mixture is achieved the PTFE particles tend to settle out in a rather short period of time. When the PTFE and carrier oil are added together with a gentle agitation, there is formed a dispersion of PTFE particles in the carrier oil. It has been found that 50% of the PTFE particles then tend to agglomerate in masses of aproximately 40-60 microns, designated as 34 in FIG. 2. 25% of the agglomerated PTFE particles form masses 32 that are in a range of 20 microns or less, which are small enough to pass immediately through the filter media 21., which allows passage of agglomerated masses up to 20 microns. The remaining 25% of the agglomerated PTFE masses are in a size range of 20-40 microns, designated as 33 in FIG. 2. The larger agglomerated PTFE masses 33,34 above 20 microns are broken down by the high temperature, pressure and swirling flow in the cartridge 10 to a size sufficiently small enough to pass through the 20 micron filter media 21. In effect, this causes a sustained time release of PTFE particles into the circulating oil to gradually enhance its lubricity.

The filter media 21 is never in danger of being clogged or robbed of its filtering capacity because the surface area of the filter media 21 is much greater than the total of the agglomerated masses and the abrasive particulates in the side spaces 17. In addition, the pressure grinding and swirling action of the internal operation of the engine 50 shears and separates the PTFE masses to smaller sizes. It is to be noted that the filter cartridge 10 should be placed in operation together with an oil change for best results. The temperature inside the crankcase 61 of most internal combustion engines 50 runs at about 350° F., and the pressure generated inside the cartridge 10 is approximately 50 psi when the engine 50 is running.

The combination of the high temperature, pressure and swirling flow within the cartridge 10 works to separate the agglomerated masses 33,34, which gradually diminish in size to below 20 microns so as to pass through the filter media 21 in smaller masses or particle form.

The PTFE particles carry a negative charge within the liquid vehicle 31. The negative charge varies over the surfaces of the particles, which, therefore behave as microscopic electrets having quasi-positive as well as negative charges. As a consequence, the bi-polar particles attract each other and agglomeration occurs. Because of the PTFE particles bi-polar affinity, they tend to agglomerate.

The high temperature, pressure and swirling flow within the cartridge 10 gradually separates the particles in the masses 33,34 from each other by breaking the bi-polar bonds and reducing the masses below 20 microns in size during the useful life of the filter. This causes all of the particles of PTFE to gradually pass through the the filter media 21 in enhancement of the lubricity of the circulating oil. The invention requires no other compounds such as surfactants or other outside compounds, to maintain a dispersion and to keep the PTFE particles from settling out. The majority of the particles will be impregnated into the filter media 21. The PTFE particles that fall off of the filter media 21 due to settling during shipment will eventually be liberated into the lubricating system as previously explained. The introduction of the PTFE particles and masses 32,33,34 into the circulating oil is systematic because each cartridge 10 is filled with the proper amount of PTFE commensurate with the requirements of the engine 51 and the number of cylinders included. Delivery of the PTFE is gradual over the period of operation because the entire filter media 21 is impregnated and it takes many multiple passes of the circulating oil through the filter media 21 to liberate all of the agglomerated PTFE masses 33,34. This is a more effective way to enhance the lubricating system by the time release of PTFE particles than by dumping a mixture of PTFE additive directly into the crankcase.

The filtering element 21 may be of any conventional type generally designed to filter out contaminants of appoximately 20 microns. The cartridge 10 is generally a spin-on full flow filter. This will clear out the majority of the abrasive particulates, but will allow the passage of a certain amount of the PTFE lubricating particles through the engine 51.

The PTFE particles are agglomerated into different size masses, so that a proportion of the finer masses as well as particles below 20 microns circulate immediately through the filter media 21 to enhance the lubrication of the engine 51. The finer particles 31 are circulating within the lubricating system and becoming part of the circulating oil's makeup or being burnished onto the internal parts of the engine 51. The larger PTFE agglomerated masses 33,34 above 20 microns are reduced in size by the high temperature, pressure and swirling flow within the cartridge 10. By the time the original finer particles 31 exhaust themselves, more particle masses 33,34 are reduced in size to pass through the filter media 21 to enhance the lubricating system.

The liquid vehicle 31 containing the PTFE dispersion can be anything from various kinds of engine oil to the most sophisticated of liquid lubricants. Ideally, it should be a liquid vehicle of additives as described in my U.S. Pat. No. 4,751,901.

In the invention, the filter media media 21 is pretreated or impregnated during manufacture of the cartridge 10 with PTFE in such a way that the PTFE leaches out gradually to enhance the lubricity of the circulating oil. In this way the engine 51 has enhanced protection against chemical corrosion as well as mechanical abrasion during the operating life of the cartridge 10.

It is to be understood that the above description and the accompanying drawings are merely illustrative of the invention, and that no limitations are intended other than as defined in the appended claims.

I claim:

1. An improved oil filter cartridge, for an internal combustion engine, of a type having a container with an input port for connection to an output of an oil circulating system of the engine to receive unfiltered oil from said engine, and an output port for connection to an input of said oil circulating system of said engine to discharge filtered and reconditioned oil back into said oil circulating system, said container having filter means positioned between said input port and said output port for removing particulate contaminants above about 20 microns in circulating through said cartridge from said engine oil, said filter cartridge including an input side adjacent the input port and the filter means, wherein said improvement comprises: said input side of said cartridge being filled with a liquid lubricating vehicle having dispersed therein from about ½ ounce to about 1 ounce of agglomerated masses of particles of solid polytetrafluoroethylene, said particles having an average size of about 3 microns, said agglomerated masses ranging in size from about 60 to about 20 microns; said lubricating vehicle providing means for circulating said agglomerated masses of about 20 microns through said engine; whereby said agglomerated masses of about 20 microns are added to the oil circulating system as soon as the cartridge is connected into said oil circulating system, and, as the engine is operated, the agglomerated masses having a size above of about 20 microns gradually break apart to a size capable of passing through said filter means to provide constant addition of lubricating polytetrafluoroethylene particles to enhance lubrication of said engine by the oil circulating system during the life of said cartridge.

2. The improved oil filter of claim 1 wherein said lubricating vehicle is 30 weight carrier oil.

3. The improved oil filter of claim 1, further including means for covering said input port and said output port to contain said lubricating vehicle and said agglomerated masses of polytetrafluoroethylene particles within said cartridge during shipping and handling, whereby said means for covering is removed before mounting said cartridge into said oil circulating system.

4. The improved oil filter of claim 1 wherein said cartridge is a spin-on full flow oil filter for internal combustion engines.

* * * * *